United States Patent [19]

Altenpohl et al.

[11] 4,412,620

[45] Nov. 1, 1983

[54] PLURAL HOOK POULTRY GRADING CARRIER SYSTEM

[76] Inventors: William F. Altenpohl, 1315 Robin Hood Rd.; Paul J. Altenpohl, 704 N. Westchester Dr., both of High Point, N.C. 27260

[21] Appl. No.: 245,693

[22] Filed: Mar. 19, 1981

[51] Int. Cl.³ .................. B65G 17/20; A22C 21/00
[52] U.S. Cl. ..................... 209/3.1; 17/44.1; 198/680; 209/593; 209/648
[58] Field of Search ............ 209/592, 593, 4, 5, 209/707, 646–648, 3.1; 198/680, 370; 17/44.1; 104/88, 93

[56] References Cited

U.S. PATENT DOCUMENTS

| | | | |
|---|---|---|---|
| 2,612,265 | 9/1952 | Altenpohl | 209/648 |
| 3,132,373 | 5/1964 | Altenpohl | 17/44.1 |
| 3,291,303 | 12/1966 | Altenpohl | 209/595 X |
| 3,511,370 | 5/1970 | Taylor | 209/592 |
| 3,596,749 | 8/1971 | Altenpohl | 198/680 X |
| 3,715,026 | 2/1973 | Barnes | 17/44.1 X |
| 3,751,762 | 8/1973 | Dillon | 17/44.1 |
| 3,795,199 | 3/1974 | Herzog | 104/93 X |

Primary Examiner—Robert B. Reeves
Assistant Examiner—Donald Hajec
Attorney, Agent, or Firm—Harvey B. Jacobson

[57] ABSTRACT

A plurality of hooks on each poultry carrier are adapted to receive poultry of different specified grades. Such carriers convey poultry along a common conveyor path to a plurality of stations, each of which services a single poultry grade corresponding to one of the hook locations. Servicing is effected by signal-controlled devices with which the different hooks are respectively associated at each of the stations.

10 Claims, 7 Drawing Figures

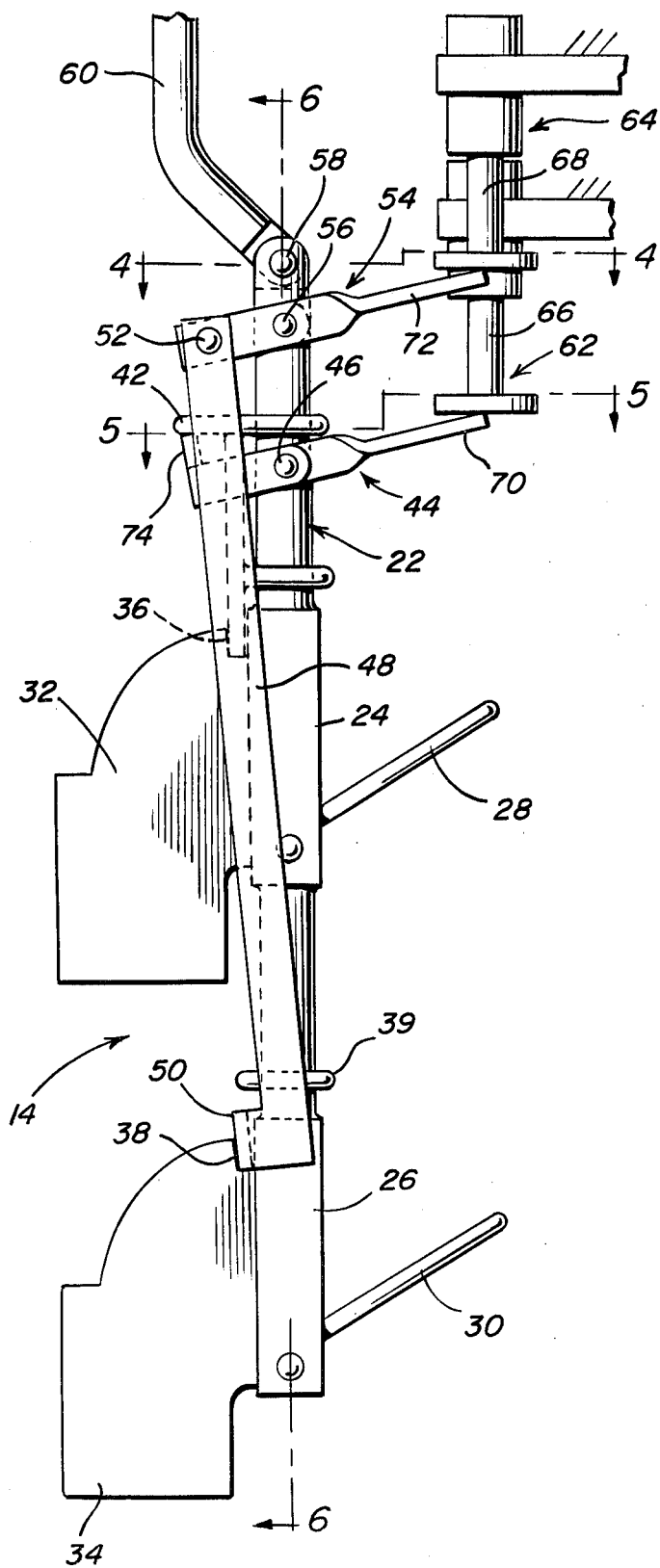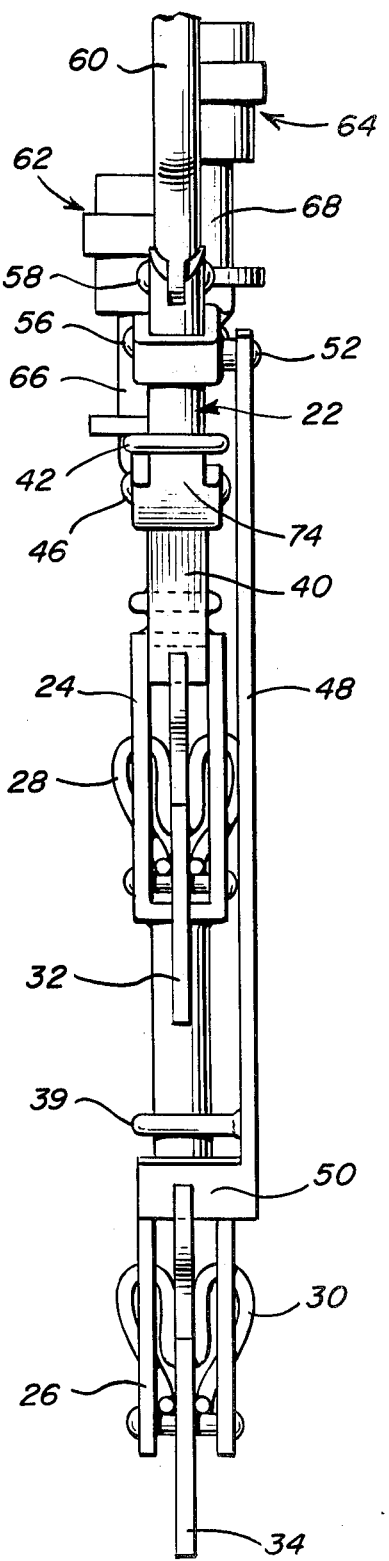

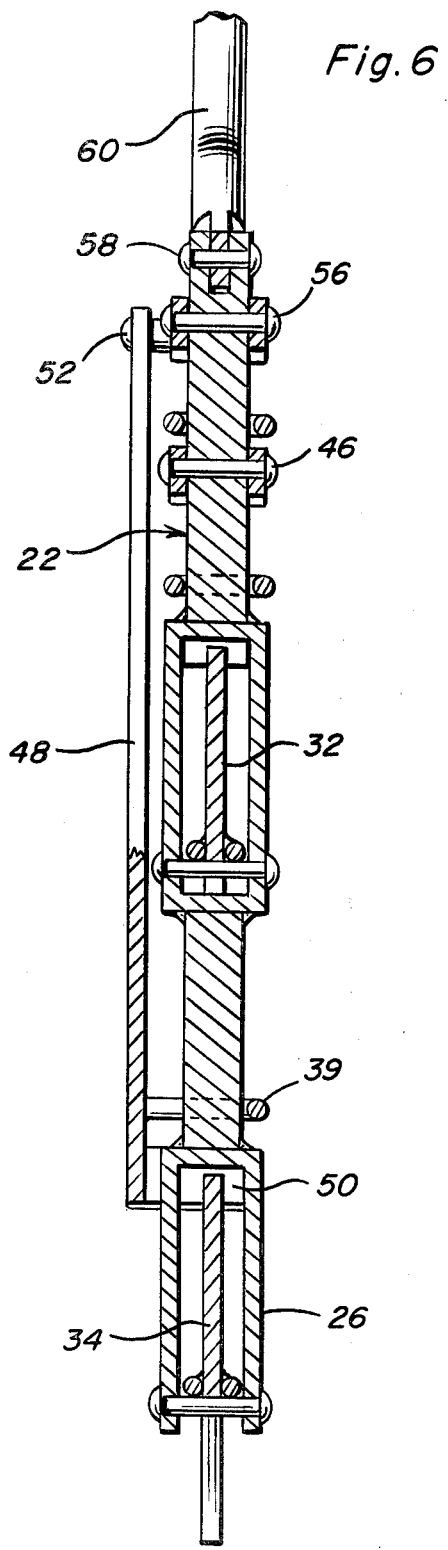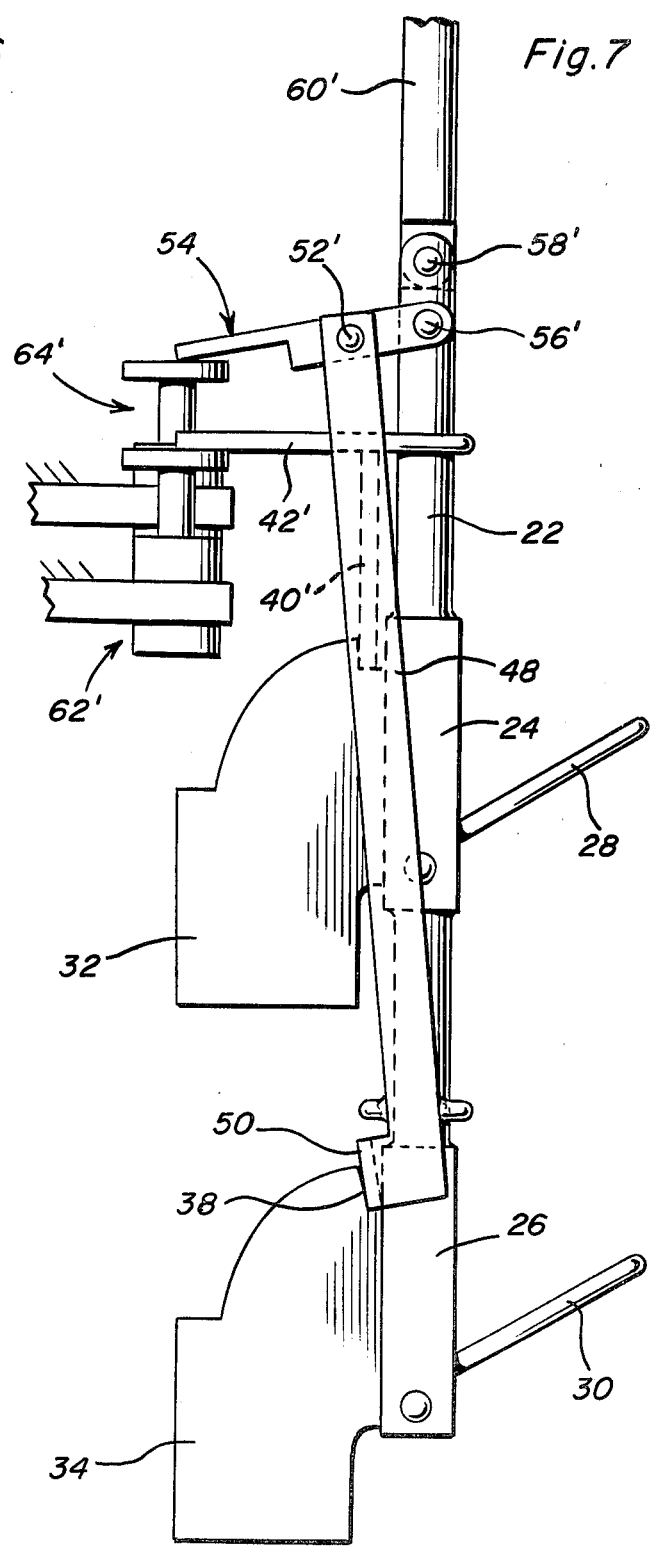

PLURAL HOOK POULTRY GRADING CARRIER SYSTEM

BACKGROUND OF THE INVENTION

This invention relates to conveyor systems through which operations are performed on transported articles such as poultry maintained segregated according to grade or quality.

Conveyor systems through which sizing operations are performed on poultry at weighing stations are already well-known, as disclosed for example in U.S. Pat Nos. 3,123,373 and 3,291,303. In order to perform such sizing or similar operations with respect to poultry of different grade or quality, separate conveyor lines were heretofore utilized, each line servicing only one poultry grade. In order to perform operations for a plurality of different grades with a single conveyor line, poultry carrier positioners have been proposed for angularly orientating each carrier in accordance with the grade of the poultry placed thereon. Such carrier positioners are disclosed in U.S. Pat. No. 3,596,749. Another method utilized for serving poultry of different grades on a single conveyor line involves the use of differently coded carriers on the same line respectively receiving poultry of different specified grades.

There are several problems or drawbacks in utilizing a single conveyor line to separately service different grades of poultry. Use of a poultry grading positioner as aforementioned requires physical reorientation of the carriers both automatically and manually which limits the production speed of the conveyor line. The reorientation procedure is sometimes a cause of malfunction and requires a high degree of attentiveness on the part of personnel. The other single conveyor line method of using differently coded carriers assigned to the handling of different poultry grades, either slows down production unnecessarily, or creates handling difficulties for personnel at the poultry loading station where the supply of poultry for each grade is erratic.

It is therefore an important object of the present invention to provide a single conveyor line system through which servicing operations may be separately performed with respect to differently classified objects, without the problems and drawbacks aforementioned.

SUMMARY OF THE INVENTION

In accordance with the present invention, a plurality of separate stations are provided along a common conveyor path at which weight sizing operations, for example, are performed with respect to different classifications, such as poultry grades, by signal controlled operation of power operated devices associated with different locations on each of the poultry carriers to which the different poultry grades are assigned. Thus, each poultry carrier is identical and mounts a plurality of hooks on which poultry is loaded in accordance with grade or quality. The latch release operations associated with the different hooks on each carrier are effected independently of each other by mechanism arranged to avoid interference and accommodate functionally operative mounting of the power operated devices at the servicing stations.

According to certain embodiments of the invention, the carrier is formed by an elongated rod-like body on which the hooks are pivotally mounted in vertically spaced relation to each other and held in latched positions by separate slidably mounted latch elements, at least one of which is operatively connected to a force transfer element to which a latch releasing force is transmitted from an associated power operated device. The force transfer element is pivotally mounted on the carrier body at a location which enables operative mounting of the power operated devices at mutually convenient locations.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

FIG. 2 is an elevation view of a poultry carrier at a servicing station in accordance with one embodiment of the invention.

FIG. 3 is an elevation view of the carrier shown in FIG. 2, at right angles thereto.

FIG. 6 is a longitudinal section view taken substantially through a plane indicated by section line 6—6 in FIG. 2.

FIG. 7 is an elevation view of a poultry carrier showing a modification of the arrangement illustrated in FIG. 2.

DETAILED DESCRIPTION OF PREFERRED EMBODIMENTS

Figure 1:
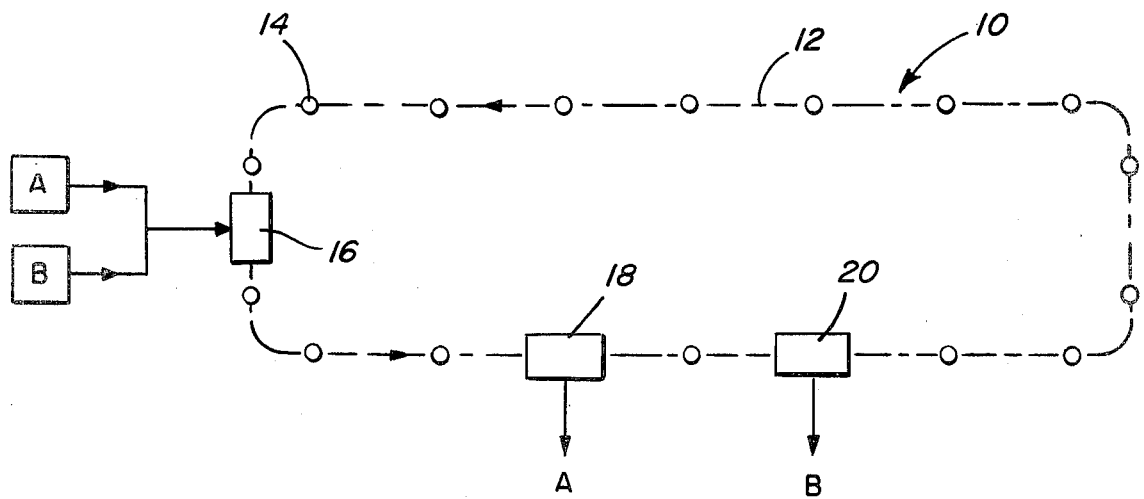
FIG. 1 is a schematic top plan view of a material servicing conveyor system with which the present invention is associated.
Figure 4:
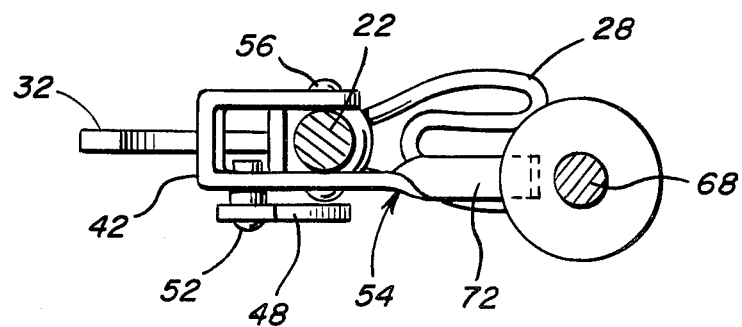
FIG. 4 is a top section view taken substantially through a plane indicated by section line 4—4 in FIG. 2.
Figure 5:
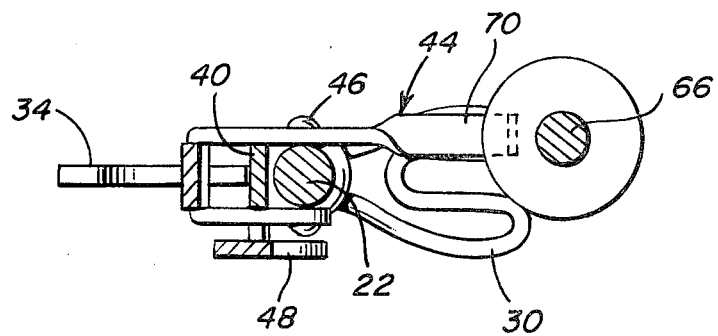
FIG. 5 is a top section view taken substantially through a plane indicated by section line 5—5 in FIG. 2.

Referring now to the drawings in detail, FIG. 1 schematically illustrates in top plan view a poultry conveying system, generally referred to by reference numeral 10. A common conveyor path 12 is shown, established by an overhead conveyor within a poultry processing plant. Poultry carriers 14 are spaced from each other on the conveyor longitudinally along the conveyor travel path 12 which extends through a loading station 16 and at least two servicing stations 18 and 20. Poultry of different grades, such as A and B, are loaded onto the carriers at station 16. Poultry of one grade, A for example, are conveyed to and serviced only at station 18, while poultry of the other grade B are serviced only at station 20. The servicing stations 18 and 20 may be weight sorting stations at which poultry within a certain weight range are dropped from the conveyor into a receiving bin. An important achievement of the present invention is the ability to load poultry of different grades on any one of the carriers 14 passing through station 16, without reorientation of the carrier.

One of the poultry carriers 14 is shown in FIG. 2 at one of the servicing stations. The connection of the carrier to the overhead conveyor and its roller support during travel through the station is already well-known in the art so that the details of such installational environment are omitted from the description to avoid unnecessary complexity.

The carrier 14 includes an elongated, rod-like body 22 of generally constant diameter except for hook mounting sections 24 and 26 from which pivoted poultry hooks 28 and 30 project. Although only two hooks are shown in the illustrated embodiment, it will be appreciated that any number of such hooks may be mounted on the common body 22 in order to accommodate all of the poultry grades being handled, each grade being associated with a different hook location on the body. The construction of the section 24 or 26, the pivotal mounting therein of the hook and its associated counterweight 32 or 34 is already well-known in the art. As is also well-known in the art, a notch 36 or 38 is formed in the counterweight in order to receive a latch element on that side of the carrier body opposite the hook so as to hold the hook in the latched position as shown. In the embodiment illustrated, the hooks are held latched at locations on the body vertically spaced from each other, with the upper hook 28 adapted to be loaded only with poultry of one grade while the lower hook 30 is adapted to be loaded only with poultry of another grade.

The upper hook 28 is held latched by a latch element 40, the construction and operation of which is also already well-known in the art. An upward latch releasing force is applied to the release arm 42 of the latch element through a force transfer element 44 in order to withdraw the latch element from notch 36 and thereby release the hook 28 for downward pivoting under load during a poultry drop off operation. The force transfer element 44 is pivotally mounted by pivot 46 on the body 22 just below the latch arm 42 in its lowered latching position.

The lower hook 30 is held latched by a latch element 48 having a lower end portion 50 adapted to be received in notch 38. A guide loop 39 extends from the latch element about the body 22 to confine movement of the latch element. The upper end of latch element 48 is connected by pin 52 to a second force transfer element 54 pivotally mounted by pivot 56 to the carrier body above latch element 40 and just below the pin connection 58 between the carrier body and suspension link 60 through which the carrier body is suspended from the conveyor.

Each weight sorting station 18 or 20 is provided with one or two power operated devices 62 and 64 respectively associated with the force transfer elements 44 and 54. These power operated devices may be signal controlled by weight sensors, as is already known in the art, to either hydraulically or electromagnetically apply an operating force to an associated force transfer element through plunger 66 or 68. The devices 62 and 64 are fixedly mounted in laterally spaced relation to the conveyor path and in vertical alignment with the laterally spaced arms 70 and 72 respectively associated with the force transfer elements 44 and 54. The force transfer elements in the embodiment illustrated in FIG. 1 are levers with intermediate pivots at 46 and 56 so that downward operating forces from the power operated devices are transmitted as upward displacing forces to the latch elements. The release arm 42 of latch element 40 is engaged by the end portion 74 of lever element 44 while the overlying end portion of lever element 54 is pivotally connected by pivot 52 to the latch element 48. The arms 70 and 72 preferably project from the force transfer elements 44 and 54 on opposite sides of the carrier body 22 so that the power operated devices may be laterally as well as vertically spaced from each other and located on the side of the body opposite the latch elements. The foregoing arrangement will therefore be suitable for a latch releasing system of the type disclosed in our copending application Ser. No. 245,214, filed Mar. 18, 1981; now U.S. Pat. No. 4,351,087 issued Sept. 28, 1982.

An alternative arrangement is shown in FIG. 7 wherein power operated devices 62' and 64' are located on the same side of carrier body 22 as the latch elements 40' and 48, the body being suspended by a link 60' through pivot connection 58'. The power operated devices 62' and 64' apply upward latch releasing forces to the latch elements. In the case of latch element 40', the upward force of power device 62' is directly applied through latch arm 42'. In the case of latch element 48, the upward force of power device 64' is applied through lever 54' having one end pivotally connected to body 22 by pivot 56' and an intermediate pivot connection at 52' to the latch element 48. Except for the latch releasing arrangement, the embodiment of FIG. 7 is similar in construction and operation to that of FIG. 1.

At any one servicing station, only one of the power operated devices is activated to release only one of the hooks corresponding to one of the grades of poultry being handled by the system. In this manner, weight sorting operations with respect to different poultry grades may be simultaneously performed on a single conveyor line. Further, all poultry carriers on the line may be utilized without reorientation since a separate hook will be available on each carrier for each of the different poultry grades.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a conveyor to which a plurality of carriers are connected for travel along a common conveyor path through stations at which operations are performed on differently classified objects, each of said carriers including an elongated body pivotally connected to the conveyor, a plurality of hooks adapted to respectively support the differently classified objects on each of the carriers, means pivotally mounting said hooks on the body in non-interfering relation to each other for projection from the carrier transversely in the same direction on one side of the conveyor path and a plurality of devices mounted at each of the stations in operative relation to the conveyor path for respectively effecting said operations on the objects supported by the hooks.

2. The combination of claim 1 wherein each of the carriers further includes a plurality of latch elements mounted on the body for respectively holding the hooks in latched positions, and at least one force transfer element operatively interconnecting one of said latch elements with one of the devices associated therewith.

3. The combination of claim 2 wherein said force transfer element is a lever having an intermediate pivot mounted on the body.

4. The combination of claim 1 wherein said hooks are mounted on the body at pivot locations vertically spaced from each other.

5. In combination with a conveyor to which a plurality of carriers are connected for travel along a common conveyor path through stations at which operations are performed on differently classified objects, each of said carriers including an elongated body pivotally connected to the conveyor, a plurality of hooks pivotally mounted on the body only on one side of the conveyor path and adapted to respectively support the differently classified objects, and a plurality of devices mounted at each of the stations in operative relation to the conveyor path for respectively effecting said operations on the objects supported by the hooks, each of the carriers further including a plurality of latch elements mounted on the body for respectively holding the hooks in latched positions projecting in the same direction from the body, and at least one force transfer element operatively interconnecting one of said latch elements with one of the devices associated therewith, said force transfer element being a lever having an intermediate pivot mounted on the body, said hooks being mounted on the body in vertically spaced relation to each other.

6. A carrier adapted to be suspended from a conveyor comprising an elongated body, a plurality of hooks operatively mounted on the body and projecting laterally therefrom in the same direction, on only one side of the body, a plurality of separate latch elements mounted on the body for independently holding the hooks in latched positions on said one side of the body, and force transfer means through which latch releasing forces are applied to the latch elements for release of the hooks associated therewith.

7. The carrier as defined in claim 6 wherein said hooks are pivotally mounted on the body at pivot locations vertically spaced from each other.

8. A carrier adapted to be suspended from a conveyor comprising an elongated body, a plurality of hooks operatively mounted on the body, a plurality of latch elements mounted on the body for separately holding the hooks in latched positions projecting in the same direction from only one side of the body, and force transfer means through which latch releasing forces are applied to the latch elements for release of the hooks associated therewith, said force transfer means including at least one lever element.

9. The carrier as defined in claim 8 wherein said hooks are pivotally mounted on the body in vertically spaced relation to each other.

10. In a system of conveying poultry of different grades to a plurality of stations along a conveyor travel path by means of poultry carriers, each of which has a plurality of hooks projecting in the same direction from vertically spaced locations to which the different grades are assigned, the steps of: grading the poultry in accordance with said different grades; placing the graded poultry on the hooks at the assigned hook locations corresponding to said different grades of the poultry; and servicing the graded poultry at each of the assigned hook locations respectively at one of the stations and only on one side of the travel path.

* * * * *